March 10, 1942.  M. SHAUNESSEY  2,276,104
VEHICLE SIGNAL
Filed July 26, 1939
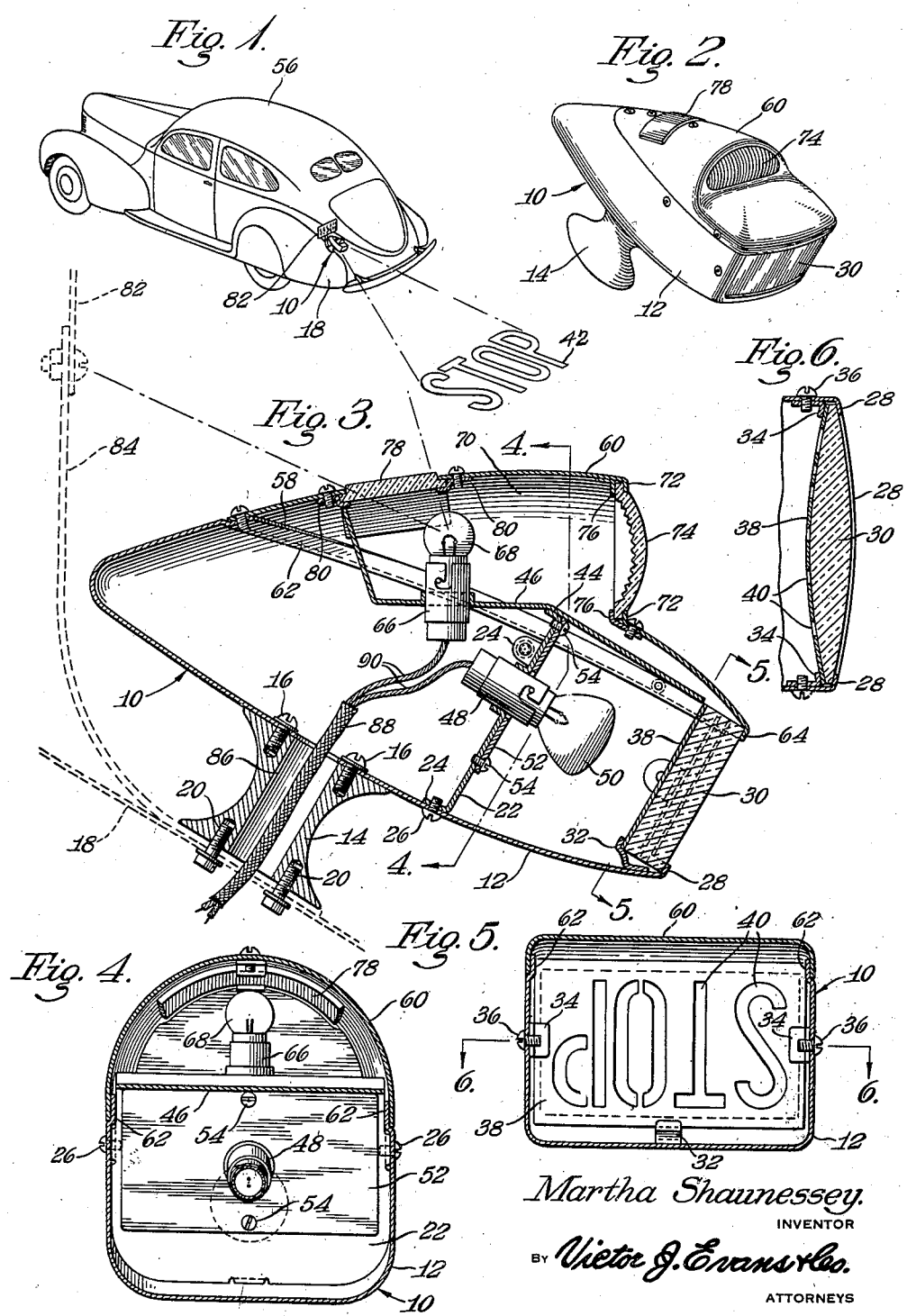
Martha Shaunessey.
INVENTOR
BY Victor J. Evans & Co.
ATTORNEYS Patented Mar. 10, 1942

2,276,104

UNITED STATES PATENT OFFICE 2,276,104

VEHICLE SIGNAL

Martha Shaunessey, Chicago, Ill.

Application July 26, 1939, Serial No. 286,672

1 Claim. (Cl. 177—329)

My invention relates to automotive vehicles, and has among its objects and advantages the provision of an improved traffic signal.

An object of my invention is to provide a traffic signal adapted to be carried on a vehicle such as an automobile in which novel means are employed for projecting the word "Stop" upon the highway at a short distance in the rear of the vehicle for signaling an intended stop. The signal is in the nature of a lamp housing provided with means for projecting the word "Stop" upon the highway in addition to including means for illuminating a license plate as well as to constitute the usual tail light function. The housing is constructed in such manner as to provide a simple and durable design adapted for connection with vehicles of conventional design.

In the accompanying drawing:

Figure 1 is a perspective view of an automobile showing my invention applied thereto;

Figure 2 is a perspective view of the device;

Figure 3 is an enlarged longitudinal sectional view of the invention;

Figure 4 is a sectional view along the line 4—4 of Figure 3;

Figure 5 is a sectional view along the line 5—5 of Figure 3; and

Figure 6 is a sectional view along the line 6—6 of Figure 5.

In the embodiment selected to illustrate my invention, I make use of a lamp housing 10 which includes a body 12 mounted on a bracket 14 through the medium of screws 16, with the bracket secured to the fender 18 or other suitable support on the vehicle through the medium of screws 20. Body 12 is provided with a wall 22 having ears 24 through the medium of which the wall may be fixedly secured to the body 12 by screws 26.

The rear end of the body 12 is open and is flanged at 28 to constitute an abutment for a double convex lens 30 of clear glass. The lower edge of the lens 30 is held against the lower flange 28 by reason of an ear 32 which may be welded to the body. The vertical edges of the lens 30 are made secure by clips 34 which may be attached to the body 12 by screws 36. Adjacent the inner face of the lens 30 I position a metallic plate 38 perforated as at 40 in Fig. 6 to provide light openings for projecting beams upon the highway to define the word "Stop," as illustrated at 42 in Fig. 1.

Wall 22 is flanged at 44 to provide a mount for a partition 46 which may constitute a metallic plate welded to the flange 44. Wall 22 is provided with a lamp socket 48 which carries a red lamp bulb 50 positioned in the rear of the lens 30 for illuminating purposes to project the signal 42. Wall 22 is provided with a metallic reflector 52 made secure by screws 54. Lamp 50 and the lens 30 are so related and angled with respect to the horizontal as to project the signal 42 onto the highway a short distance in the rear of the vehicle 56.

Body 12 is provided with an opening 58 which is sufficiently large to permit the lamps, wall and partition being assembled as a unit and inserted therethrough into the housing. The opening is closed by a cover 60, and the body is offset at 62 so that the outer face of the cover 60 will lie flush with the adjacent outer face of the body 12 about the offset. Cover 60 includes a flange 64 which overlies the outer marginal face of the lens 30 along its upper edge.

Partition 46 is provided with a lamp socket 66 which carries a clear bulb 68, and the partition 46 is so fashioned as to cooperate with the cover 60 to provide a compartment 70 which houses the lamp 68. Cover 60 is provided with an opening and flanged about the opening as at 72 for supporting a red lens 74. The latter is held against the flange 72 by clips 76. Lens 74 constitutes the tail light lens. Cover 60 is also provided with a clear lens 78 made secure by clips 80, and the lens is arranged to project light onto the license plate 82 which may be mounted on a suitable bracket 84 adjacent the housing 10.

Bracket 14 includes a bore 86 for accommodating the cord 88 which contains the wires 90 for supplying current to the lamps 50 and 68. Lamp 50 will, of course, be wired in such manner as to be illuminated through actuation of the brake pedal, in the usual manner.

Housing 10 is fashioned in such manner as to facilitate fabrication from a single piece of sheet metal, and the cover 60 is also fashioned from a single piece of material, with the two parts so shaped as to provide a housing of pleasing appearance. Body 12 is angled with respect to the horizontal and cooperates with the lamp 50 and the lens 30 in such manner as to project the signal 42 onto the highway a short distance rearwardly of the vehicle so as to be readily discernible by approaching drivers. Lamp 68 cooperates with the lens 74 to provide a tail light, while lens 68 also provides illumination for the license plate.

Fig. 5 illustrates the perforations 40 as being inverted so that the signal 42 will be in an upright position when viewed by approaching drivers. Signal 42 is magnified so as to increase its visibility and the signal is illuminated in red for emphasizing the need for caution on the part of approaching drivers.

Having thus described certain embodiments of my invention in detail, it is, of course, understood that I do not desire to limit the scope thereof to the exact details set forth except in so far as those details may be defined in the appended claim.

I claim:

A vehicle signal of the type described comprising an elongated housing, a first lens in the front end of the housing, a lamp supporting wall detachably secured to the housing rearwardly of this first lens, a partition secured to the lamp supporting wall, the partition having a first portion cooperating with the lamp supporting wall and with the front portion of the housing to provide a lamp chamber in the rear of the first lens, a lamp within the lamp chamber and mounted on the lamp supporting wall, a second portion of the partition extending rearwardly to provide a support for a second lamp, the top of the housing having an opening sufficiently large to permit the lamps, wall and portion to be assembled as a unit and inserted through the opening into the housing, a dish-shaped cover closing the opening, the second lamp being located within the cover, the forward portion of the cover being in the form of a ledge which closely overlies the first portion of the partition, the front end of this ledge assisting in retaining the first lens in place, a second lens mounted in the cover adjacent to the rear of the ledge portion and a third lens mounted in the top of the cover adjacent to its rear end.

MARTHA SHAUNESSEY.